United States Patent
Kozakai

(10) Patent No.: US 9,805,862 B2
(45) Date of Patent: Oct. 31, 2017

(54) ELECTRONIC COMPONENT, POWER FEEDING APPARATUS, POWER RECEIVING APPARATUS, AND WIRELESS POWER FEEDING SYSTEM

(75) Inventor: Osamu Kozakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 926 days.

(21) Appl. No.: 13/215,559

(22) Filed: Aug. 23, 2011

(65) Prior Publication Data

US 2012/0049645 A1  Mar. 1, 2012

(30) Foreign Application Priority Data

Aug. 30, 2010 (JP) .................. 2010-192088

(51) Int. Cl.
| | | |
|---|---|---|
| *H01F 17/00* | (2006.01) | |
| *H02J 17/00* | (2006.01) | |
| *H01F 38/14* | (2006.01) | |
| *H04B 5/00* | (2006.01) | |
| *H01F 27/28* | (2006.01) | |
| *H01F 27/36* | (2006.01) | |

(52) U.S. Cl.
CPC .......... *H01F 38/14* (2013.01); *H04B 5/0037* (2013.01); *H04B 5/0075* (2013.01); *H01F 27/2804* (2013.01); *H01F 27/36* (2013.01)

(58) Field of Classification Search
CPC ....................................... H02J 7/025
USPC .................. 307/104; 174/350, 354
See application file for complete search history.

(56) References Cited

U.S. PATENT DOCUMENTS

| | | | | |
|---|---|---|---|---|
| 2,579,223 | A * | 12/1951 | Baker ................... | 323/291 |
| 3,560,983 | A * | 2/1971 | Willie .................. | 343/744 |
| 3,823,985 | A * | 7/1974 | Hubbard .............. | 303/7 |
| 4,041,364 | A * | 8/1977 | Gauper, Jr. .......... | 363/15 |
| 4,690,609 | A * | 9/1987 | Brown ................. | 414/543 |
| 5,206,587 | A * | 4/1993 | Rose ................... | 324/207.16 |
| 5,596,487 | A * | 1/1997 | Castaneda et al. ... | 361/814 |
| 6,480,020 | B1 * | 11/2002 | Jung et al. ........... | 326/30 |
| 6,549,800 | B1 * | 4/2003 | Atalar et al. ........ | 600/423 |
| 6,657,595 | B1 * | 12/2003 | Phillips et al. ...... | 343/702 |
| 6,963,310 | B2 * | 11/2005 | Horita et al. ........ | 343/702 |
| 8,395,352 | B2 * | 3/2013 | Aoyama et al. ..... | 320/108 |
| 8,653,698 | B2 * | 2/2014 | Baarman et al. .... | 307/104 |
| 2003/0116790 | A1 | 6/2003 | Kikuchi et al. | |
| 2004/0120107 | A1 * | 6/2004 | Davis et al. ........ | 361/683 |
| 2004/0219888 | A1 * | 11/2004 | Iwamoto et al. .... | 455/76 |
| 2005/0016746 | A1 * | 1/2005 | Sze et al. ............ | 174/35 R |
| 2005/0039935 | A1 * | 2/2005 | Kolb et al. ......... | 174/35 R |

(Continued)

FOREIGN PATENT DOCUMENTS

| | | |
|---|---|---|
| JP | 06-124850 | 5/1994 |
| JP | 3377756 | 12/2002 |

(Continued)

*Primary Examiner* — Jared Fureman
*Assistant Examiner* — Aqeel Bukhari
(74) *Attorney, Agent, or Firm* — Chip Law Group

(57) ABSTRACT

The present disclosure provides an electronic component, including, a coil, and a circuit portion having a grounding terminal and a hot terminal and connected to the coil, wherein the grounding terminal of the circuit portion is connected to one end side of the coil, and the hot terminal of the circuit portion is connected to the other end side of the coil, thereby integrating the circuit portion with the coil.

20 Claims, 16 Drawing Sheets

(56) References Cited

U.S. PATENT DOCUMENTS

| | | | | |
|---|---|---|---|---|
| 2006/0260838 A1* | 11/2006 | Ariel | ............................ | 174/350 |
| 2007/0171681 A1* | 7/2007 | Baarman | ......................... | 363/16 |
| 2008/0048646 A1* | 2/2008 | Wilkerson et al. | ........... | 324/127 |
| 2008/0051854 A1* | 2/2008 | Bulkes et al. | ................ | 607/60 |
| 2008/0062668 A1* | 3/2008 | Kakinoki et al. | ............. | 361/816 |
| 2008/0082147 A1* | 4/2008 | Dai et al. | ........................ | 607/61 |
| 2008/0297107 A1* | 12/2008 | Kato et al. | .................... | 320/108 |
| 2009/0096413 A1* | 4/2009 | Partovi et al. | ................ | 320/108 |
| 2009/0146892 A1* | 6/2009 | Shimizu et al. | ............... | 343/745 |
| 2009/0206675 A1* | 8/2009 | Camurati | ............... | H02J 17/00 |
| | | | | 307/104 |
| 2009/0243397 A1* | 10/2009 | Cook et al. | ................... | 307/104 |
| 2009/0243621 A1* | 10/2009 | Kudo et al. | ................... | 324/426 |
| 2010/0084918 A1* | 4/2010 | Fells et al. | ....................... | 307/32 |
| 2010/0087235 A1* | 4/2010 | Chiang | ...................... | 455/575.7 |
| 2010/0088534 A1* | 4/2010 | Watanabe et al. | ............ | 713/340 |
| 2010/0109443 A1* | 5/2010 | Cook et al. | ................... | 307/104 |
| 2010/0109444 A1* | 5/2010 | Lemmens | .................... | 307/104 |
| 2010/0198312 A1* | 8/2010 | Stevenson et al. | ............. | 607/63 |
| 2010/0209299 A1* | 8/2010 | Nikitin et al. | .................. | 422/69 |
| 2011/0018669 A1* | 1/2011 | Ikriannikov | .................. | 336/192 |
| 2011/0025133 A1* | 2/2011 | Sauerlaender et al. | ....... | 307/104 |
| 2011/0050164 A1* | 3/2011 | Partovi et al. | ................ | 320/108 |
| 2011/0163608 A1* | 7/2011 | Brohlin | ................... | H02J 5/005 |
| | | | | 307/104 |
| 2011/0204713 A1* | 8/2011 | Wenger et al. | ................ | 307/9.1 |
| 2011/0285210 A1* | 11/2011 | Lemmens et al. | ........... | 307/104 |

FOREIGN PATENT DOCUMENTS

| | | |
|---|---|---|
| JP | 3377787 | 12/2002 |
| WO | WO 2010020519 A1 * | 2/2010 |

* cited by examiner $$f_0 = \frac{1}{2\pi\sqrt{LC}}$$

ELECTRONIC COMPONENT, POWER FEEDING APPARATUS, POWER RECEIVING APPARATUS, AND WIRELESS POWER FEEDING SYSTEM

BACKGROUND

The present disclosure relates to an electronic component in which a coil (inductor) and a circuit portion connected to the coil are integrated with each other, a power feeding apparatus for feeding an electric power in a non-contact (wireless) manner by using a wireless power feeding system, a power receiving apparatus for receiving an electric power in the wireless manner by using the wireless power feeding system, and a wireless power feeding system.

An electromagnetic induction system is known as a system for carrying out supply of an electric power in a non-contact (wireless) manner.

In addition, in recent years, a wireless power feeding and charging system using either a system called a magnetic field sympathetic resonance system utilizing an electromagnetic sympathetic resonance phenomenon, or a system called an electric wave type has attracted attention.

In the non-contact power feeding system as the electromagnetic induction system which has already been generally used at present, a power feeding source and a power feeding destination (electric power receiving side) need to hold a magnetic flux in common. Thus, for the purpose of efficiently feeding the electric power, the power feeding source and the power feeding destination need to be disposed in close proximity to each other. Also, axis alignment for the coupling between the power feeding source and the power feeding destination is also important.

On the other hand, the non-contact power feeding system using the electromagnetic sympathetic resonance phenomenon has advantages that it can feed the electric power at a distance as compared with the case of the electromagnetic induction system because of the principles of the electromagnetic sympathetic resonance phenomenon, and even when the axis adjustment is poor a little, the feeding efficiency is not reduced so much.

It is noted that an electric field sympathetic resonance system using the electromagnetic sympathetic resonance phenomenon is known in addition to the magnetic field sympathetic resonance system using the electromagnetic sympathetic resonance phenomenon.

In the wireless power feeding system of the magnetic field sympathetic resonance type, the axis alignment is unnecessary, and it is possible to lengthen the power feeding distance.

Now, not only in the non-contact power feeding system, but also in an electronic apparatus including a coil, a capacitor, a composite electronic component, and the like, an integrated combination of a coil and a circuit portion is carried out.

Japanese Patent Nos. 3,377,756 and 3,377,787 disclose a technique with which in order to reduce a parasitic capacitance between an analog circuit portion and a coil when a circuit portion and a coil for communication are disposed close to each other, the circuit portion and the coil for communication are disposed so as not to overlap each other.

In addition, Japanese Patent Laid-Open No. Hei 6-124850 discloses a method of integrating a circuit, a multi-layer capacitor, and a coil with one another. With this method, a laminated body element and a circuit board which were manufactured separately from each other are joined to each other by using an adhesive agent, thereby realizing a multi-layer composite electronic component which is excellent in temperature characteristics.

SUMMARY

However, in the case of the technique disclosed in Japanese Patent Nos. 3,377,756 and 3,377,787, since the circuit portion and the coil for communication exist separately from each other, it becomes important that for the purpose of reducing an influence of the floating capacitance, the circuit portion and the coil for communication are physically disposed away from each other.

That is to say, the reduction of the influence described above causes a problem that the entire size becomes large.

In addition, in the case of the technique as well described in Japanese Patent Laid-Open No. Hei 6-124850, the coil, the capacitor portion, and the circuit portion are basically manufactured separately from one another, and are disposed close to one another by using the adhesive agent.

In a word, the technique described in Japanese Patent Laid-Open No. Hei 6-124850 dose not also solve the problem that the interference between the circuit and the coil which is set forth as the problem in Japanese Patent Nos. 3,377,756 and 3,377,787.

The present disclosure has been made in order to solve the problems described above, and it is therefore desirable to provide an electronic component, a power feeding apparatus, a power receiving apparatus, and a wireless power feeding system in each of which an entire size can be reduced because characteristics deterioration due to a floating capacitance, an eddy-current loss, and the like can be prevented from being caused when a circuit portion and a coil are disposed close to each other and thus the circuit portion and the coil can be integrated with each other.

In order to attain the desire described above, according to an embodiment of the present disclosure, there is provided an electronic component including: a coil; and a circuit portion having a grounding terminal and a hot terminal and connected to the coil, in which the grounding terminal of the circuit portion is connected to one end side of the coil, and the hot terminal of the circuit portion is connected to the other end side of the coil, thereby integrating the circuit portion with the coil.

According to another embodiment of the present disclosure, there is provided a power feeding apparatus including: a power transmitting side coil portion having a coil adapted to transmit an electric power in a wireless manner; a converter converting an AC electric power into a DC electric power; and a power transmitting circuit receiving the DC electric power obtained through the conversion in the converter, and generating a high-frequency electric power for wireless power transmission, thereby supplying the resulting high-frequency electric power to the power transmitting side coil portion, in which a circuit portion having a grounding terminal and a hot terminal, connected to the coil, and having sympathetic the power transmitting circuit and sympathetic the converter is formed; and the grounding terminal of the circuit portion is connected to one end side of the coil, and the hot terminal of the circuit portion is connected to the other end side of the coil, thereby integrating the circuit portion with the coil.

According to still another embodiment of the present disclosure, there is provided a power receiving apparatus including: a power receiving side coil portion having a coil receiving an electric power transmitted in a wireless manner; a rectifying circuit rectifying the electric power received by the power receiving side coil portion; and a power source circuit stabilizing the electric power obtained through rectification in the rectifier circuit, and supplying the electric power thus stabilized to a load, in which a circuit portion having a grounding terminal and a hot terminal, connected to the coil, and having at least the rectifying circuit and the power source circuit is formed; and the grounding terminal of the circuit portion is connected to one end side of the coil, and the hot terminal of the circuit portion is connected to the other end side of the coil, thereby integrating the circuit portion with the coil.

According to yet another embodiment of the present disclosure, there is provided a wireless power feeding system including: a power feeding apparatus; and a power receiving apparatus receiving an electric power transmitted from the power feeding apparatus with a magnetic field sympathetic resonance relationship, in which the power feeding apparatus includes: a power transmitting side coil having a coil adapted to transmit an electric power in a wireless manner; a converter converting an AC electric power into a DC electric power; and a power transmitting circuit receiving the DC electric power obtained through the conversion in the converter, and generating a high-frequency electric power for wireless power transmission, thereby supplying the resulting high-frequency electric power to the power transmitting side coil portion; the power receiving apparatus includes: a power receiving side coil portion having a coil receiving an electric power transmitted in a wireless manner; a rectifying circuit rectifying the electric power received by the power receiving side coil portion; and a power source circuit stabilizing the electric power obtained through the rectification in the rectifier circuit, and supplying the electric power thus stabilized to a load, in which at least one of the power feeding apparatus and the power receiving apparatus includes a circuit portion having a grounding terminal and a hot terminal, the grounding terminal is connected to one end side of the coil and the hot terminal is connected to the other end side of the coil, thereby integrating the circuit portion with the coil.

As set forth hereinabove, according to the present disclosure, since the characteristics deterioration due to the floating capacitance, the eddy-current loss, and the like can be prevented from being caused when the circuit portion and the coil are disposed close to each other, and the circuit portion and the coil can be integrated with each other, the entire size can be reduced.

DETAILED DESCRIPTION OF THE PREFERRED EMBODIMENT

An embodiment of the present disclosure will be described in detail hereinafter with reference to the accompanying drawings.

It is noted that the description will be given below in accordance with the following order:

1. Basic Configuration of Wireless Power Feeding System;
2. Integrated Configuration of Power Transmitting Side Coil and Power Transmitting System Circuit Portion; and
3. Integrated Configuration of Power Receiving Side Coil and Power Receiving System Circuit Portion.

1. Basic Configuration of Wireless Power Feeding System

Figure 1:
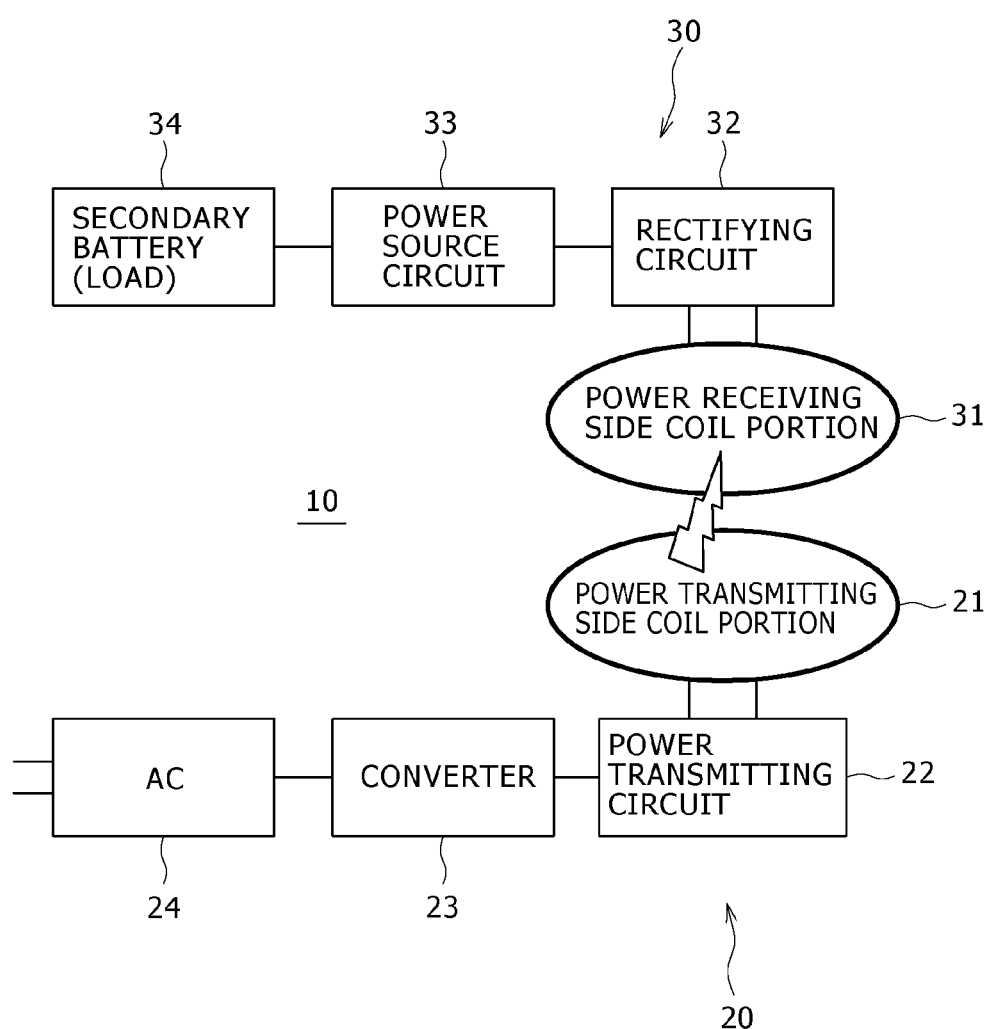
FIG. 1 is a block diagram showing an entire configuration of a wireless power feeding system according to an embodiment of the present disclosure.

FIG. 1 is a block diagram showing an entire configuration of a wireless power feeding system according to an embodiment of the present disclosure.

Figure 2:
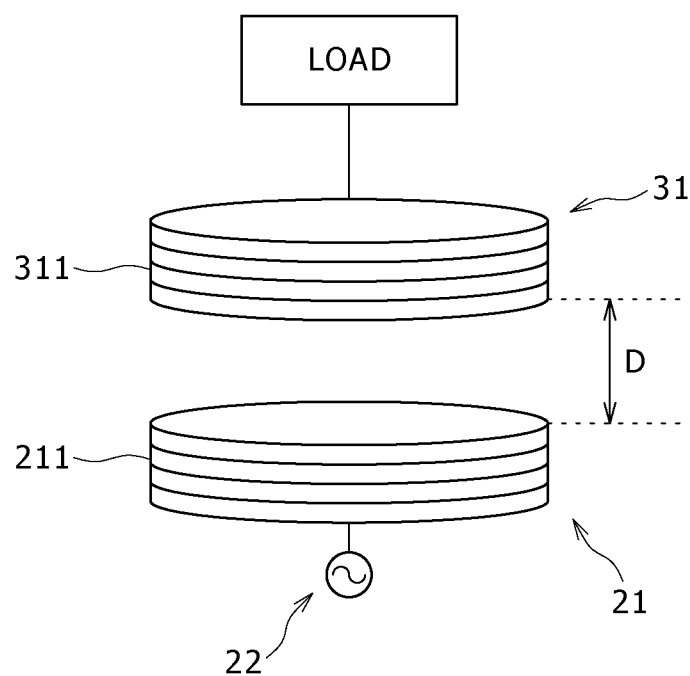
FIG. 2 is a view schematically showing a basic relationship between a power transmitting side coil and a power receiving side coil of the wireless power feeding system according to the embodiment of the present disclosure.

FIG. 2 is a view schematically showing a basic relationship between a power transmitting side coil and a power receiving side coil of the wireless power feeding system according to the embodiment of the present disclosure.

The wireless power feeding system 10 includes a power feeding apparatus 20 as a primary side apparatus, and a power receiving apparatus 30 as a secondary side apparatus.

The power feeding apparatus 20 includes a power transmitting side coil portion 21 which can transmit (feed) an electric power in a wireless manner, a power transmitting circuit 22, a converter 23, and an AC cable portion 24.

It is noted that in the embodiment of the present disclosure, as will be described later, a power transmitting system circuit portion 25 is composed of the power transmitting circuit 22 and the converter 23, and has a configuration of being integrated with a coil of the power transmitting side coil portion 21.

The power transmitting side coil portion 21 includes a sympathetic resonance coil 211 as a sympathetic resonance element. Although the sympathetic resonance coil is referred to as the resonance coil as well, in the embodiment, the term of the sympathetic resonance coil is adopted.

In addition, the power transmitting side coil portion 21 is provided with a power feeding coil as a power feeding element in some cases.

A high-frequency electric power for wireless electric power transmission is supplied from the power transmitting circuit 22 to the sympathetic resonance coil 211.

When the sympathetic resonance coil 211 agrees in self-resonant frequency with a sympathetic resonance coil 311 of the power receiving apparatus 30, the sympathetic resonance coil 211, and the sympathetic resonance coil 311 show a magnetic field sympathetic resonance relationship. As a result, the electric power is efficiently transmitted.

The power transmitting circuit 22 generates a high-frequency electric power for wireless electric power transmission.

Since the power transmitting circuit 22 preferably generates the high-frequency electric power with high efficiency, a switching amplifier or the like is used as the power transmitting circuit 22.

The high-frequency electric power generated in the power transmitting circuit 22 is fed (applied) to the sympathetic resonance coil 211 of the power transmitting coil portion 21 through an impedance detector, a matching circuit and the like (not shown).

The converter 23 converts an AC electric power into a DC electric power, and supplies the resulting DC electric power to the power transmitting circuit 22.

As will be described later, the converter 23 is configured so as to include an AC/DC converter and a DC/DC converter.

The power receiving apparatus 30 is configured so as to include a power receiving side coil portion 31, a rectifying circuit 32, a power source circuit (voltage stabilizing circuit) 33, and a battery (secondary battery) 34 as a load.

The power receiving apparatus 30 is equipped with the secondary battery 34 as the load such as a mobile phone.

It is noted that in the embodiment, as will be described later, a power receiving system circuit portion 35 is composed of the rectifying circuit 32 and the power source circuit 33, and has a configuration of being integrated with a coil of the power receiving side coil portion 31.

The power receiving side coil portion 31 includes a resonance (sympathetic resonance) coil 311 as a sympathetic resonance element.

In addition, the power receiving side coil portion 31 is provided with a power feeding coil to which an AC is fed from the sympathetic resonance coil 311 by the electromagnetic induction in some cases.

When the sympathetic resonance coil 311 agrees in self-resonant frequency with the sympathetic resonance coil 211 of the power feeding apparatus 20, the sympathetic resonance coil 311 and the sympathetic resonance coil 211 show a magnetic field sympathetic resonance relationship. As a result, the electric power is received with high efficiency.

The rectifying circuit 32 rectifies the AC electric power received into a DC electric power and supplies the resulting DC electric power to the power source circuit 33.

The power source circuit 33 converts the DC electric power supplied thereto from the rectifying circuit 32 into a stabilized DC voltage complying with a specification of an electronic apparatus as an electric power supply destination, and supplies the resulting stabilized DC voltage to the secondary battery 34 as the load as the electronic apparatus.

Figure 3:
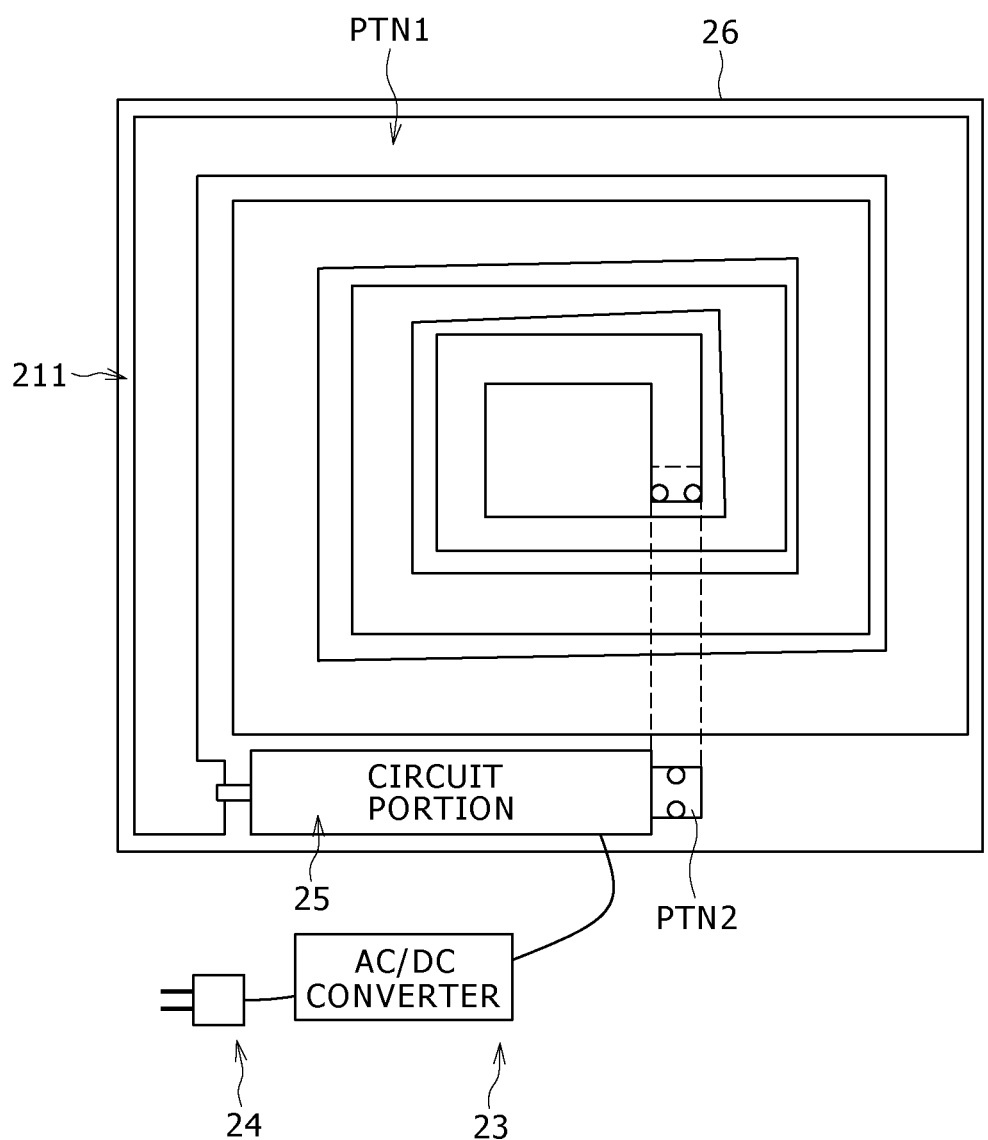
FIG. 3 is a view schematically showing an example of a configuration of an integrated combination of the power transmitting side coil and a power transmitting system circuit portion in the embodiment of the present disclosure.

2. Integrated Configuration of Power Transmitting Side Coil and Power Transmitting System Circuit Portion FIG. 3 is a view schematically showing an example of a configuration of an integrated combination of a power transmitting side coil and a power transmitting system circuit portion in the wireless power feeding system according to the embodiment of the present disclosure.

Figure 4:
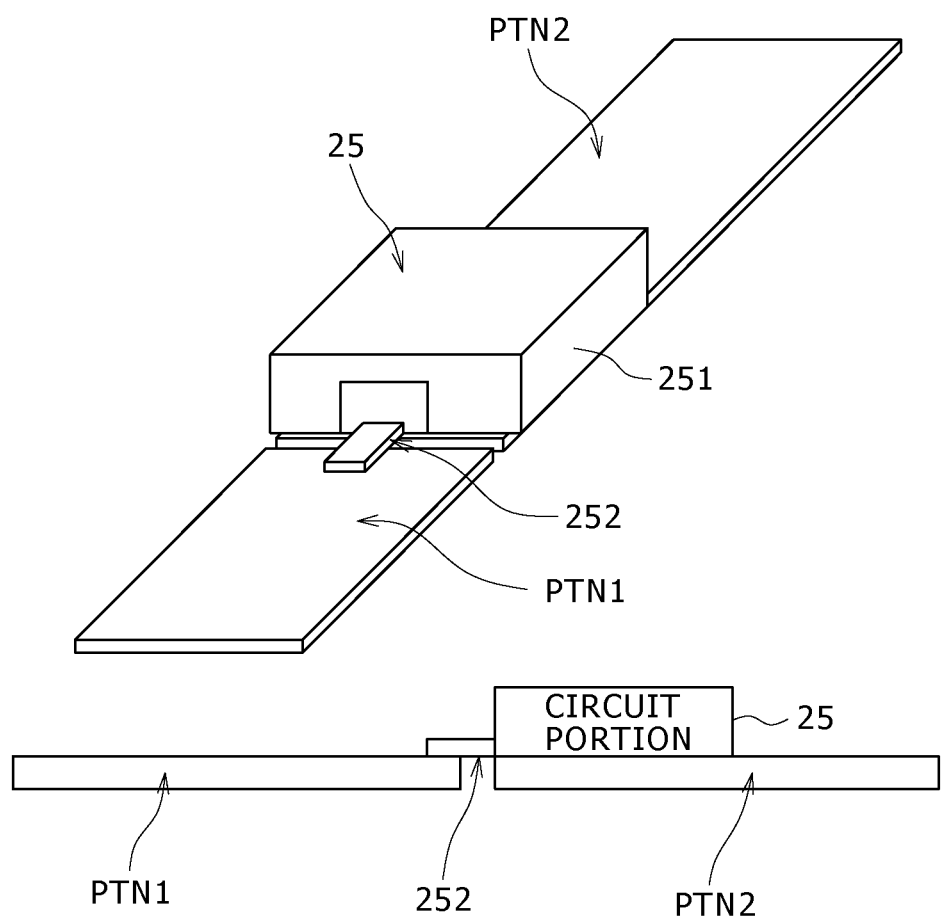
FIG. 4 is a view schematically showing a connection state between a coil pattern and the power transmitting system circuit portion of a power feeding apparatus of the wireless power feeding system according to the embodiment of the present disclosure.

FIG. 4 is a view schematically showing a connection state between a coil pattern and the power transmitting system circuit portion of a power feeding apparatus of the wireless power feeding system according to the embodiment of the present disclosure.

As will be described below, in the embodiment, the coil 211 of the power feeding apparatus 20, and the power transmitting system circuit portion 25 including the power transmitting circuit 22 and the converter 23 are formed integrally with each other.

Basically, a portion at a grounding (GND) potential of the power transmitting system circuit portion 25 is electrically connected to a pattern of the coil 211. Thus, the power transmitting system circuit portion 25 functions as one element for determining an inductance value of the coil 211.

The power transmitting system circuit portion 25 is shielded and thus a shield structure functions as one element for determining the inductance value of the coil 211.

The coil 211 has a structure of making resonance at a desired resonant frequency fo, and thus either the circuit portion or the shield structure functions as one element for determining the resonant frequency fo.

A floating capacitance component of the coil, the capacitance of the capacitor element, or the like is used as a capacitance composing this resonance at this time.

In addition, the shield case also plays a role of a function as a radiator.

As has been described, in the embodiment, the coil 211 of the power feeding apparatus 20, and the power transmitting system circuit portion 25 including the power transmitting circuit 22 and the converter 23 are formed integrally with each other. Here, the reason why this configuration of the integrated combination is adopted will be described below.

In the electromagnetic induction or magnetic field sympathetic resonance type wireless power feeding system, the magnetic field mainly carries out the exchange of the electric power. The coil is generally used in order to carry out transmission/reception of the electric power through the magnetic field. An electric power transmission efficiency η between coils is expressed by Expression (1):

$$\eta = k \times Q \quad (1)$$

where k is a coupling coefficient, and Q is a no-load Q of the coil.

One of the causes for reducing the coupling coefficient, k, and the no-load, Q, of the coil is characteristics deterioration due to a near metal.

Figure 5:
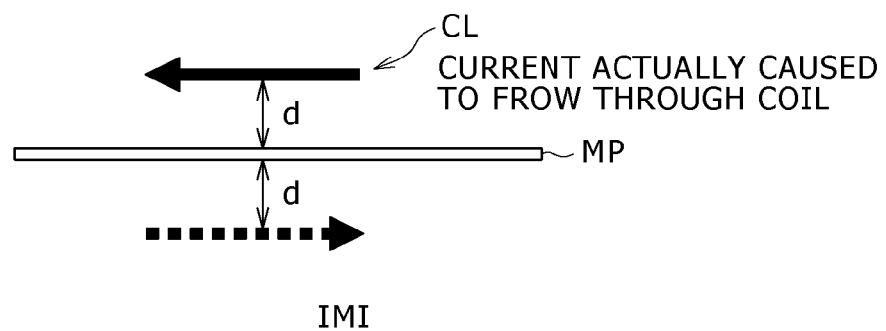
FIG. 5 is a view showing a situation in which an image current when a metallic plate is located in the vicinity of a coil is caused to flow.

FIG. 5 is a view showing a situation in which an image current when a metallic plate is located in the vicinity of a coil is caused to flow.

As shown in FIG. 5, when the metallic plate MP is disposed close to the coil CL, a circumferential electromagnetic field distribution acts like an image current IMI is equivalently caused to flow. The magnetic field formed by the image current IMI cancels a magnetic field formed by a current which is actually caused to flow through the coil CL, which reduces the Q value of the coil CL. In addition, at this time, since a large current (eddy-current) is caused to flow on the metallic plate MP, a conductor loss is caused to become a loss.

For example, when a wireless power feeding (charging) system is considered, a configuration thereof comes to be as shown in FIG. 1, and the power transmitting circuit 22, and the converter 23 such as an AC/DC converter circuit are necessary for the power transmitting coil side.

The rectifying circuit 32, the power source circuit 33, the secondary battery (battery) 34, and the like are necessary for the power receiving coil side as well.

Since these circuit portions are made of many metallic materials, the power feeding characteristics are largely deteriorated in some cases when these circuit portions are each disposed in the vicinity of the coil.

Figure 6:
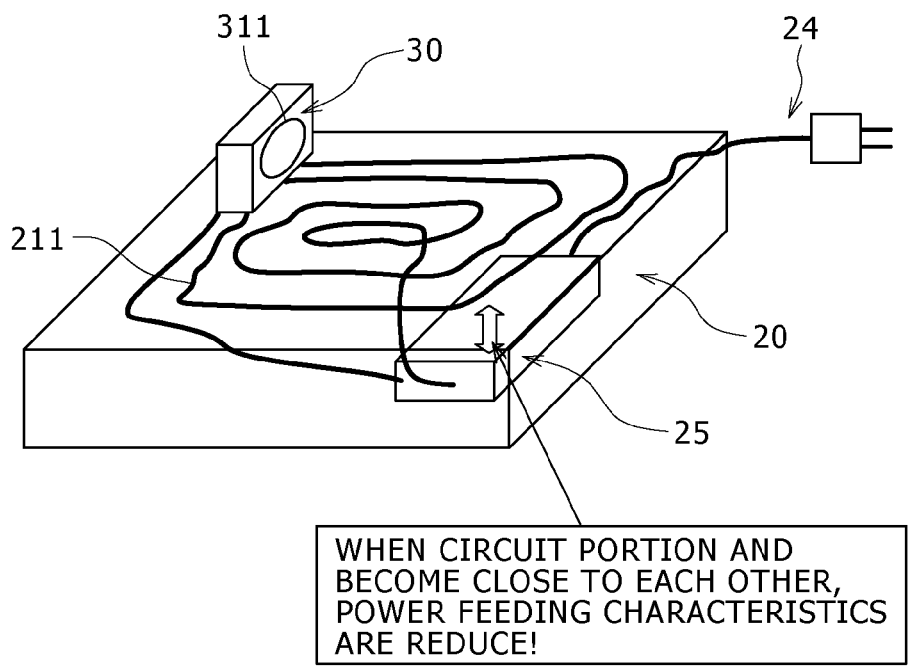
FIG. 6 is a view showing a configuration of an actual wireless charging (power feeding) system.

FIG. 6 is a view showing a configuration of an actual wireless charging (power feeding) system.

When the usability for a user is taken into consideration, preferably, the power feeding apparatus 20 as the primary side apparatus has a suitable area, and a portable electronic apparatus becoming the secondary side is freely placed on a planar surface of the power feeding apparatus 20. In addition, since the secondary coil 311 is preferably disposed inside a projected area of the primary side coil, the primary side coil 211 is desirably wound around the entire surface of the primary side apparatus.

For the purpose of miniaturizing a size of the entire power feeding apparatus 20 as the primary side apparatus, it is expected that the power transmitting system circuit portion 25 is placed below the primary side coil. However, at this time, there is the possibility that since the metal of the power transmitting system circuit portion 25 is close to the coil 211, the coil characteristics are reduced, and as a result, the power feeding characteristics are reduced.

In order to cope with such a situation, in the embodiment, in the power feeding apparatus 20, as shown in FIGS. 3 and 4, the power transmitting system circuit portion 25 is configured so as to be integrated with the coil 211.

For example, the coil 211 is formed into a spiral pattern PTN1 on a board 26, and the power transmitting system circuit portion 25 is also formed into a pattern PTN2 on the same board 26 similarly to the case of the coil 211.

The power transmitting system circuit portion 25 is accommodated in a shield case 251.

Also, a portion at the grounding (GND) potential of the power transmitting system circuit portion 25 is provided in the form of the pattern PTN2 so as to extend to the outside of the shield case 251. Also, the pattern PTN2 is electrically connected to one end side (inner circumference side end portion) of the spiral pattern PTN1 of the coil 211. In addition, a power feeding terminal (hot terminal) 252 of the power transmitting system circuit portion 25 is connected to the other end (outer circumference side end portion) of the spiral pattern PTN1 of the coil 211.

Since a large high-frequency current is caused to flow on the coil 211, a loss needs to be reduced as much as possible. For this reason, the power transmitting system circuit portion 25 is preferably covered with the shield case 251. The shield case 251 is made of a metallic member, such as aluminum, which functions as an electric field shielding portion.

In this case, a power feeding portion of the power feeding apparatus 20 comes to be as shown in FIG. 4.

In addition, since the power transmitting system circuit portion 25 is integrated with the coil 211, a high-frequency current is caused to flow through the ground GND of the power transmitting system circuit portion 25.

The high-frequency current is caused to flow through the shield case 251 as a shield portion which covers the power transmitting system circuit portion 25. However, when a thickness of the shield metal is small, the high-frequency current leaks to the inside of the shield case 251 to cause the characteristics reduction.

A high-frequency current is mainly caused to flow through a surface of a metal. Thus, the high-frequency current is reduced as a depth of the metal the inside of which the high-frequency current enters is larger. A depth at which a current becomes 37/100 times smaller than that of a surface current is referred to as a skin depth. The skin depth δ is expressed by Expression (2):
Expression (2):

$$\delta = \sqrt{(2/\sigma\omega\mu)} \quad (2)$$

where σ is a conductivity, μ is a permeability, and ω is an angular frequency.

Therefore, preferably, the metal of each of the metallic shield and the circuit pattern has a thickness which is several times as large as the skin depth.

Also, in the embodiment, as described above, basically, the portion at the grounding (GND) potential of the power transmitting system circuit portion 25 is electrically connected to the pattern of the coil 211. Thus, the power transmitting system circuit portion 25 functions as one element for determining an inductance value of the coil 211.

A description will now be given with respect to the fact that the power transmitting system circuit portion 25 functions as one element for determining the inductance value of the coil 211 in the manner as described above.

Figure 7:
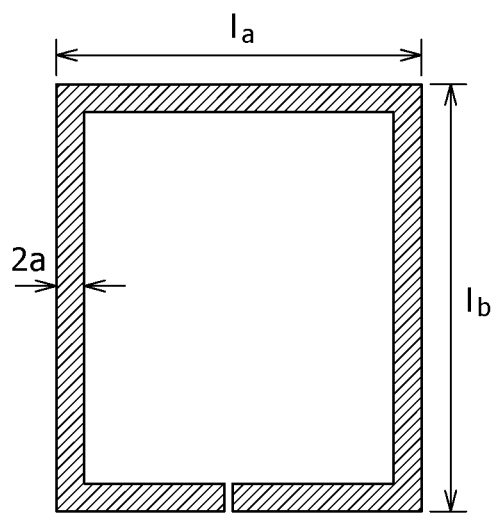
FIG. 7 is a view explaining an example of a calculation of an inductance value described in a design guide.

FIG. 7 is a view explaining an example of a calculation of an inductance value described in a design guide.

Figure 8:
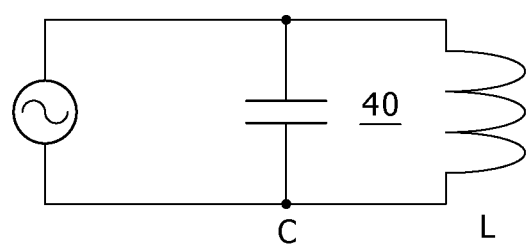
FIG. 8 is a circuit diagram showing a basic configuration of a resonance circuit composed of an inductor and a capacitor.

FIG. 8 is a circuit diagram showing a basic configuration of a resonance circuit composed of an inductor and a capacitor.

FIG. 7 shows an example of a calculation for an inductance value described in a design guide presented by Microchip Technology Inc.

As expressed in Expression (3), an inductance value L depends on a long side lb, a short side la, and a line width a:
Expression (3)

$$L = 4\left\{l_b \ln\left(\frac{2A}{a(l_b + l_c)}\right) + l_a \ln\left(\frac{2A}{a(l_a + l_c)}\right) + 2[a + l_c - (l_a + l_b)]\right\}(nH) \quad (3)$$

Now, lc and A in Expression (3) are expressed by Expression (4):

Expression (4)

$$lc=\sqrt{l_a^2+l_b^2}$$

$$A=l_a \times l_b \quad (4)$$

In Expressions (3) and (4), each of units is cm.

When the power transmitting system circuit portion 25 is disposed on the coil 211 by using a method utilized in the embodiment of the present disclosure, it is understood that the short side, la, the long side, lb, and the line width, a, are influenced by the power transmitting system circuit portion 25, that is, the physical structure of the power transmitting system circuit portion 25 becomes one element for determining the inductance value.

In this case, one winding of rectangular loop coil is given as an example. However, even in the case of plural windings of rectangular loop or circular loop, similarly, the power transmitting system circuit portion (circuit block) 25 is disposed on the coil, whereby the physical structure of the power transmitting system circuit portion 25 becomes one element for determining the inductance value L.

In addition, when a resonance circuit 40 is configured by using an inductance L and a capacitance C as shown in FIG. 8, the resonant frequency fo is obtained from $1/2\pi\sqrt{LC}$.

That is to say, it can be said that the physical structure of the power transmitting system circuit portion 25 disposed on the coil 211 is one element for determining the inductance value L, and is also one element for determining the resonant frequency fo.

By the way, the floating capacitance component which the coil itself has, a capacitance of an external capacitor, or the like is used as the capacitance C.

Here, let us consider a distribution of the high-frequency current when the power feeding apparatus in the embodiment is driven.

Figure 9:
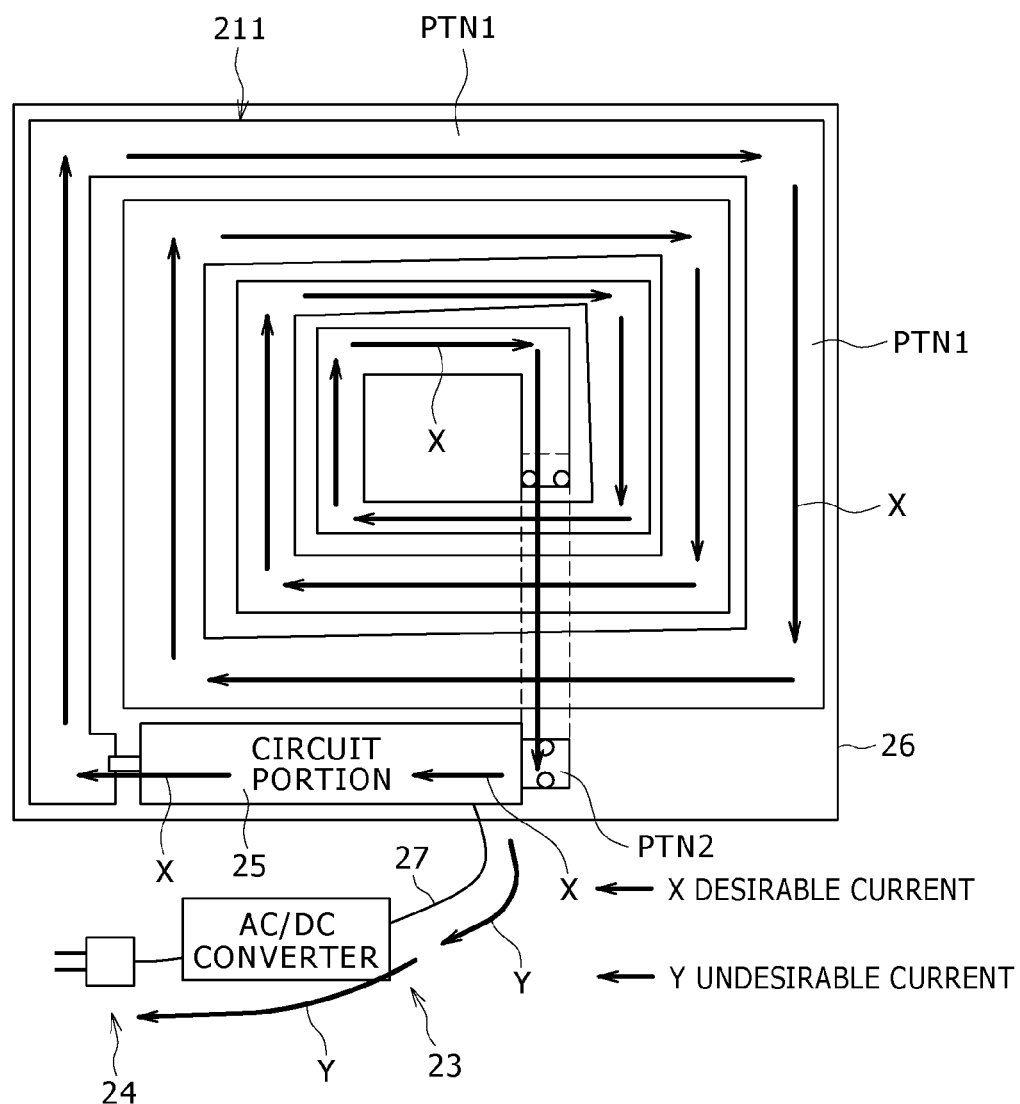
FIG. 9 is a view showing a situation of a distribution of a high-frequency current when the power feeding apparatus of the wireless power feeding system according to the embodiment of the present disclosure is driven.

FIG. 9 is a view showing a situation of a distribution of a high-frequency current when the power feeding apparatus of the wireless power feeding system according to the embodiment of the present disclosure is driven.

Ideally, as indicated by arrows X in FIG. 9, the high-frequency current is caused to flow only through the coil portion (including the circuit portion integrated with the coil portion).

However, a power source line 27 needs to be wired outside the power transmitting system circuit portion 25. Thus, since the power source line 27 is electrically connected to the power transmitting system circuit portion 25, as indicated by arrows Y in FIG. 9, an undesirable current is induced in the power source line 27 as well.

The undesirable high-frequency current generates an unintended radiation electromagnetic field. As a result, a problem about a bad influence exerted on the power feeding characteristics or the circumferential apparatus, or the like is feared.

Figure 10:
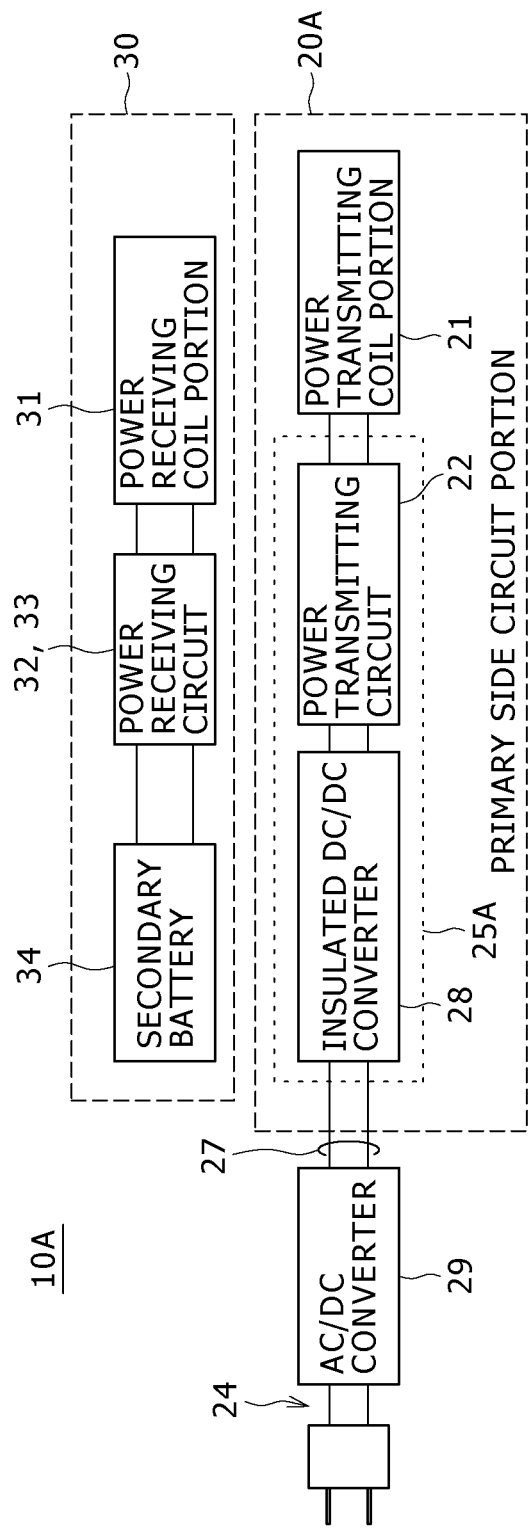
FIG. 10 is a block diagram showing a configuration in which an insulated DC/DC converter is inserted into a circuit portion in the wireless power feeding system according to the embodiment of the present disclosure.

FIG. 10 is a block diagram showing a configuration in which an insulated DC/DC converter is inserted into the power transmitting system circuit pattern in the wireless power feeding system according to the embodiment of the present disclosure.

Figure 11:
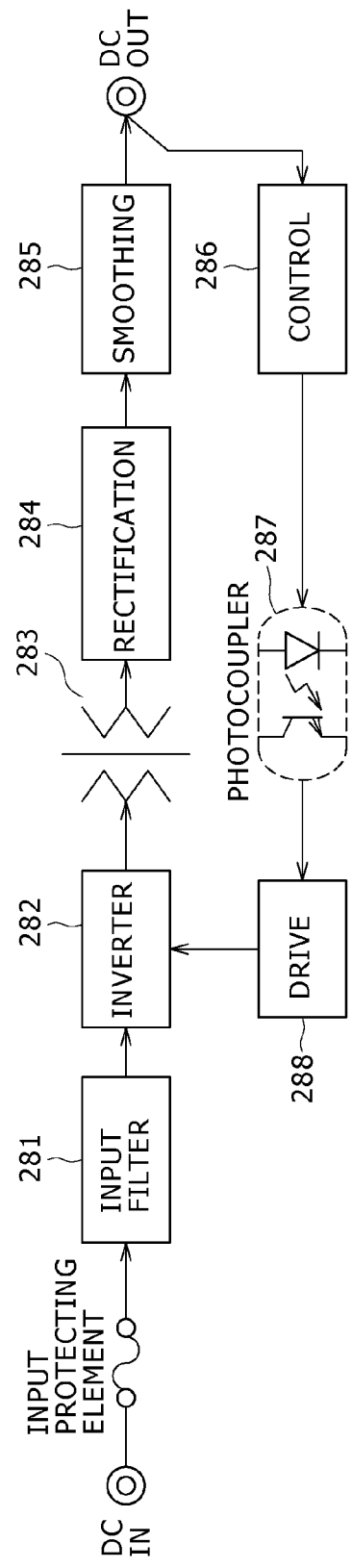
FIG. 11 is a block diagram, partly in circuit, showing a configuration of the insulated DC/DC converter.

FIG. 11 is a block diagram, partly in circuit, showing a configuration of the insulated DC/DC converter.

The insulated DC/DC converter 28 shown in FIG. 11 includes an input filter 281, an inverter 282, an output transformer 283, a rectifying circuit 284, and a smoothing circuit 285. In addition, the insulated DC/DC converter 28 includes a control portion 286, a photocoupler 287, and a drive circuit 288 as a feedback control system.

In this case, the insulated DC/DC converter 28 is included in a power transmitting system circuit portion 25A and is connected to an AC/DC converter 29 in the outside of the power transmitting system circuit portion 25A through the power source line 27.

With regard to a method of improving the problem about the influence by the radiation electromagnetic field due to the undesirable high-frequency current, for example, as shown in FIG. 10, it is possible to adopt a method of inserting the insulated DC/DC converter 28 between the primary side apparatus and the power source line 27 extending from the primary side apparatus to the outside.

As shown in FIG. 11, the insulated DC/DC converter has an insulation configuration by interposing the output transformer 283 in the middle of the circuit of the insulated DC/DC converter. In a word, adoption of the insulation configuration prevents the high-frequency current from leaking to the external power source line 27.

Figure 12:
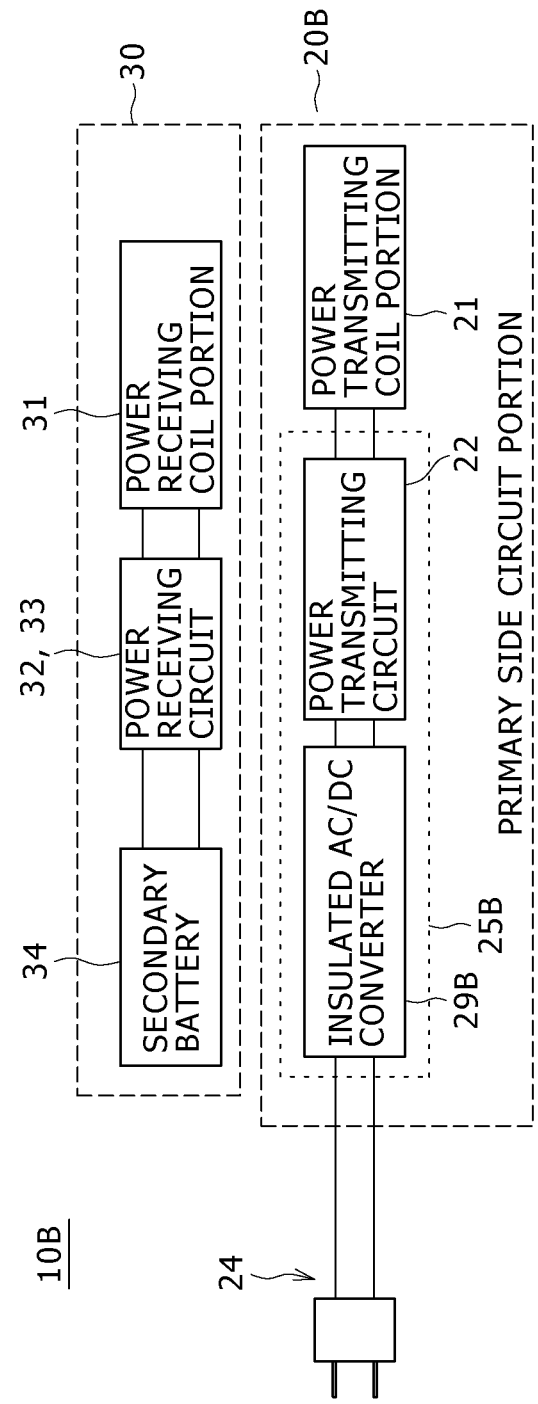
FIG. 12 is a block diagram showing a configuration in which an insulated AC/DC converter is inserted into a circuit portion in the wireless power feeding system according to the embodiment of the present disclosure.

FIG. 12 is a block diagram showing a configuration in which an insulated AC/DC converter is inserted into a power transmitting system circuit portion in the wireless power feeding system according to the embodiment of the present disclosure.

As shown in FIG. 12, the insulated AC/DC converter 29B can be adopted instead of adopting the insulated DC/DC converter 28.

In such a manner, the AC/DC converter 29 is made to be of the insulation type, and the AC/DC converter 29B is installed in a power transmitting system circuit portion 25B provided inside the primary side apparatus.

In the case of the insulated AC/DC converter 29B as well, since the insulation by the transformer is carried out inside the insulated AC/DC converter 29B, the high-frequency current can be prevented from leaking to the outside.

Figure 13:
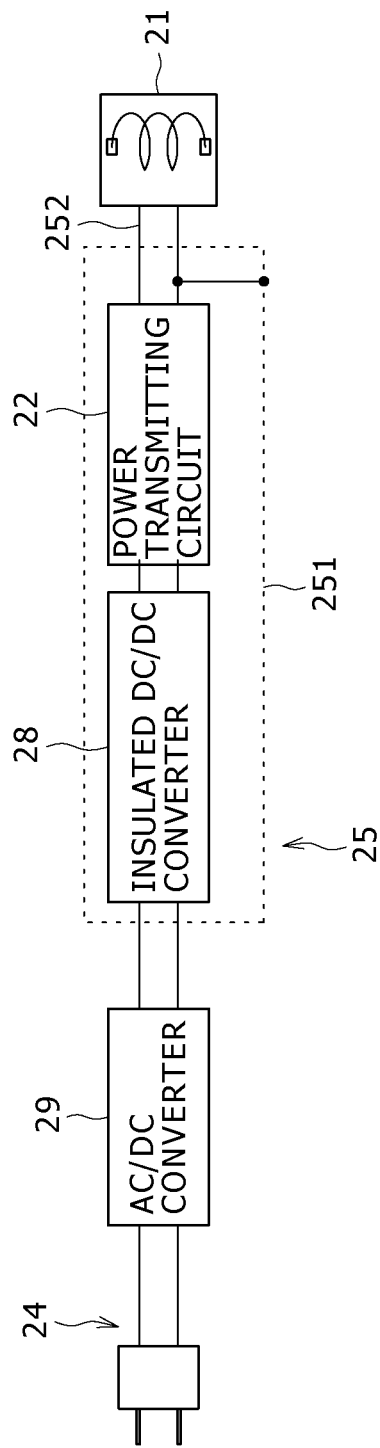
FIG. 13 is a block diagram showing a connection relationship between a shield case and a coil of a primary side circuit portion when the configuration shown in FIG. 10 is adopted.

FIG. 13 is a block diagram showing a connection relationship between a shield case and a coil of a primary side circuit portion when the configuration shown in FIG. 10 is adopted.

Figure 14:
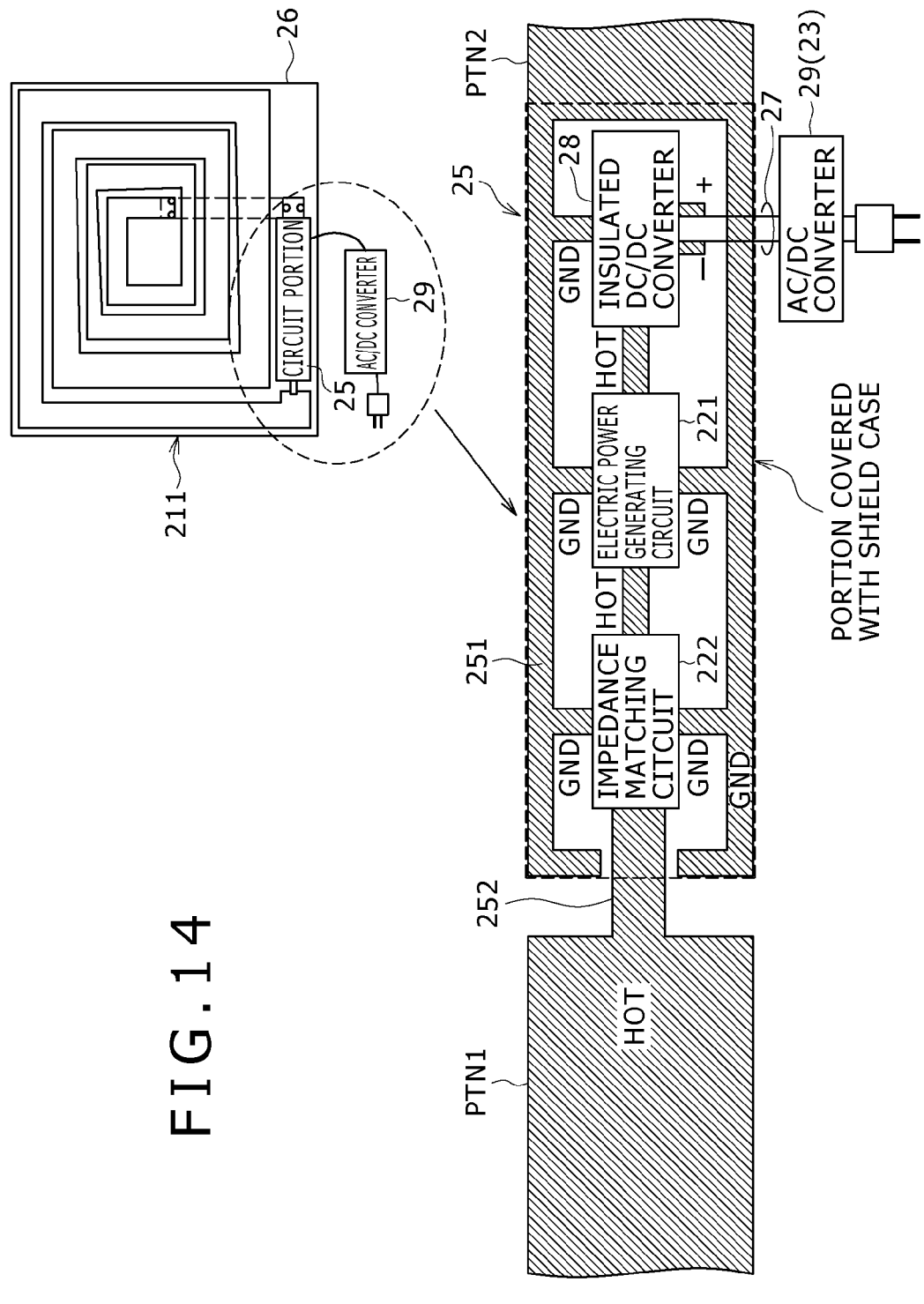
FIG. 14 is a block diagram concretely showing a connection relationship between the shield case and the coil of a primary side circuit portion shown in FIG. 13.

FIG. 14 is a block diagram concretely showing a connection relationship between the shield case and the coil of the primary side circuit portion shown in FIG. 13.

In the case of FIG. 14, the power transmitting circuit 22 includes an electric power generating circuit 221, and an impedance matching circuit 222. In this case, the electric power generating circuit 221 receives a DC electric power from the insulated DC/DC converter 28, and generates an electric power to be transmitted. Also, the impedance matching circuit 222 carries out impedance matching for the power feeding apparatus.

An output terminal of the power transmitting circuit 22 is connected as a hot terminal 252 to the outer circumference side end portion of the coil pattern PTN1, and a grounding GND terminal thereof is connected to the shield case 251.

A portion at the grounding (GND) potential of the circuit portion 25 extends as the pattern PTN2 to the outside of the shield case 251. Also, the pattern PTN2 is electrically connected to one end side (inner circumference side end portion) of the spiral pattern PTN1 of the coil 211.

A terminal (+) and a terminal (−) of the insulated DC/DC converter 28 are connected to the AC/DC converter 29 provided outside the power transmitting system circuit portion 25A through the power source line 27.

3. Integrated Configuration of Power Receiving Side Coil and Power Receiving System Circuit Portion FIG. 15 is a block diagram schematically showing a configuration of an integrated combination of a power receiving side coil and a power receiving system circuit portion in the embodiment of the present disclosure.

Figure 16:
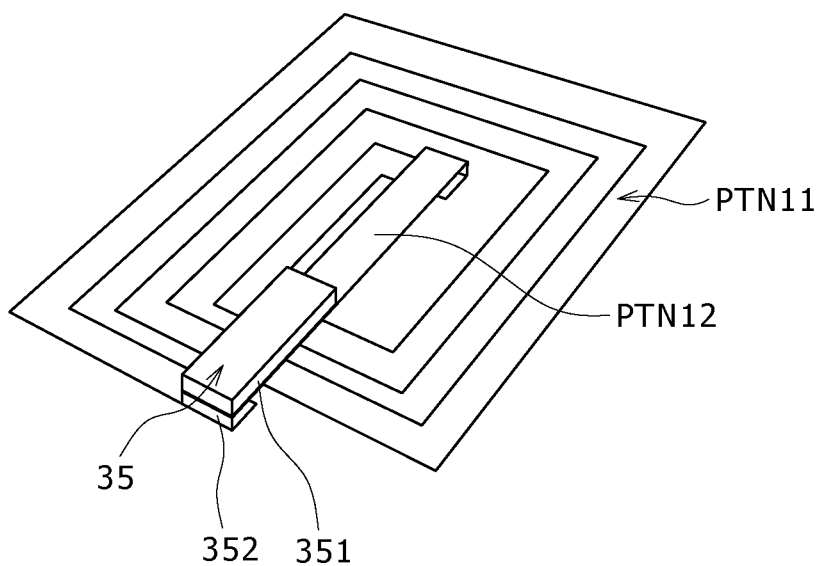
FIG. 16 is a perspective view schematically showing a connection state between a coil pattern and a circuit portion of a power receiving apparatus of the wireless power feeding system according to the embodiment of the present disclosure.

FIG. 16 is a perspective view schematically showing a connection state between a coil pattern of a circuit portion of a power receiving apparatus of the wireless power feeding system according to the embodiment of the present disclosure.

As described above, there was shown the configuration in which the primary side coil 211 of the wireless power feeding (charging) system was integrated with the primary side power transmitting system circuit portion 25. Likewise, there is shown a configuration in which the secondary side coil 311 is integrated with the secondary side circuit portion 35.

Figure 15:
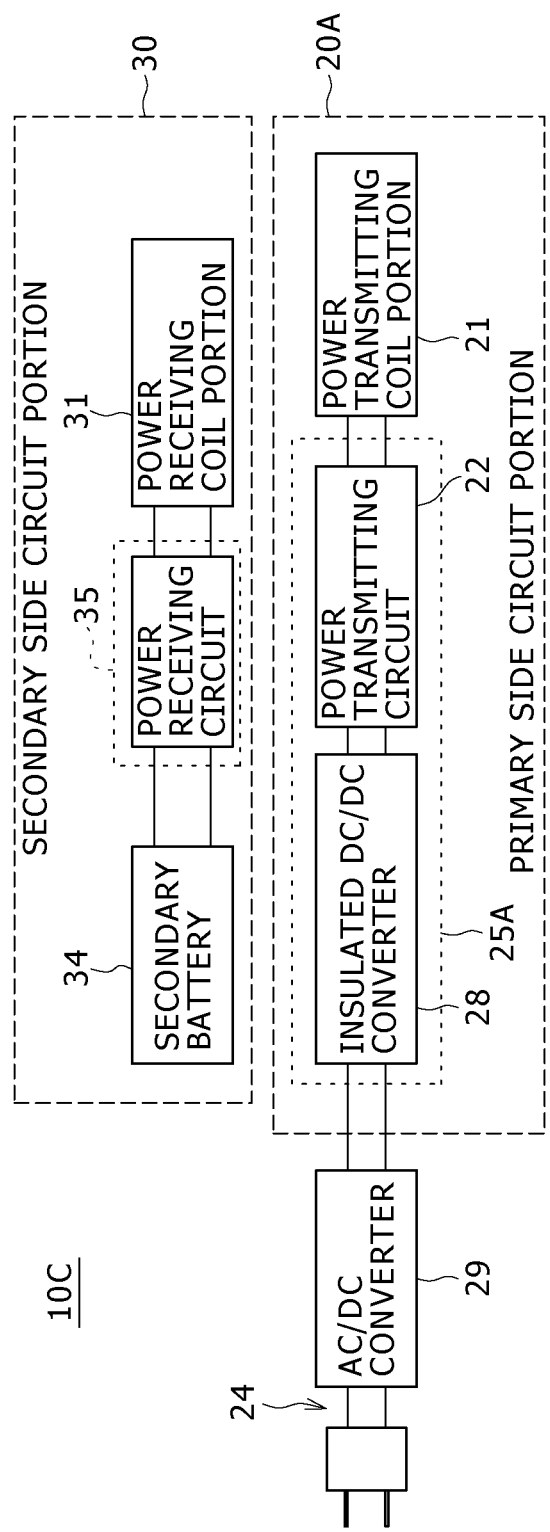
FIG. 15 is a block diagram schematically showing a configuration of an integrated combination of a power receiving side coil and a power receiving system circuit portion in the embodiment of the present disclosure.

In the embodiment, in the power receiving apparatus 30C, as shown in FIGS. 15 and 16, a configuration is adopted in which a circuit portion 35 is integrated with a coil 311.

For example, the coil 311 is formed into a spiral pattern PTN11 on a board, and the circuit portion 35 is also formed into a pattern PTN12 on the same board similarly to the case of the coil 311.

The circuit portion 35 is accommodated in a shield case 351.

Also, a portion at the grounding (GND) potential of the circuit portion 35 is provided in the form of the pattern PTN12 so as to extend to the outside of the shield case 351. Also, the pattern PTN12 is electrically connected to one end side (inner circumference side end portion) of the spiral pattern PTN11 of the coil 311. In addition, a power feeding terminal (hot terminal) of the circuit portion 35 is connected to the other end (outer circumference side end portion) of the spiral pattern PTN11 of the coil 311.

Figure 17:
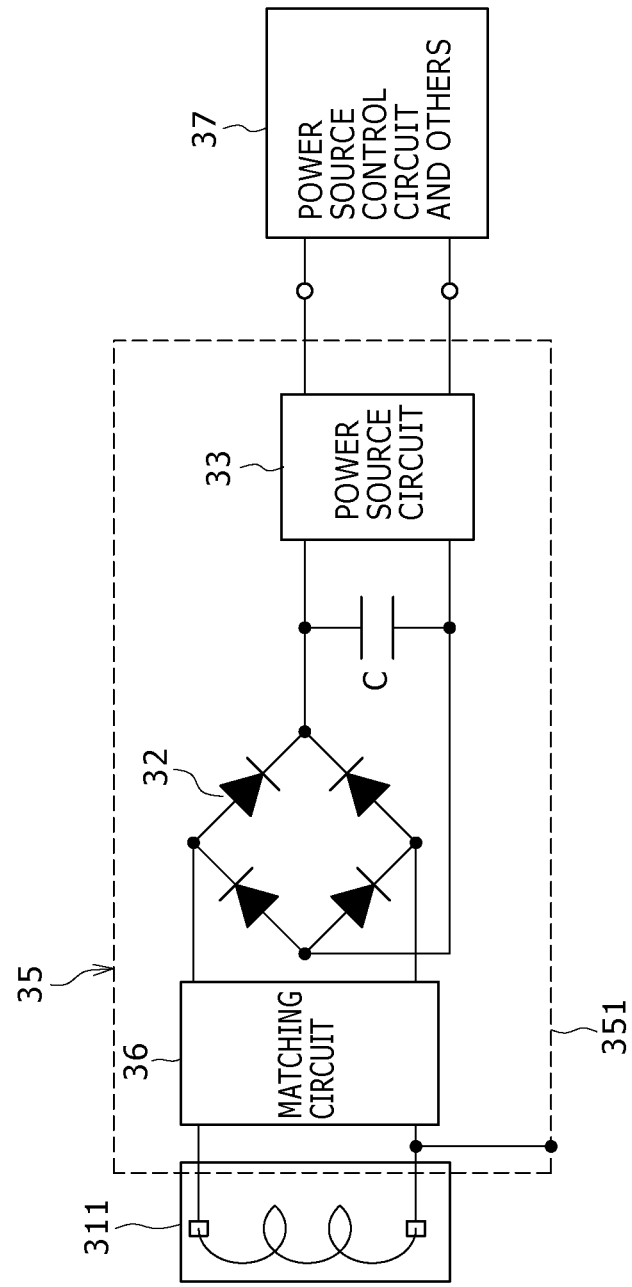
FIG. 17 is a circuit diagram, partly in block, showing a connection relationship between a shield case and a coil of a secondary side circuit portion when the configuration shown in FIG. 15 is adopted.

FIG. 17 is a circuit diagram, partly in block, showing a connection relationship between the shield case and the coil of the secondary side circuit portion when the configuration shown in FIG. 15 is adopted.

Figure 18:
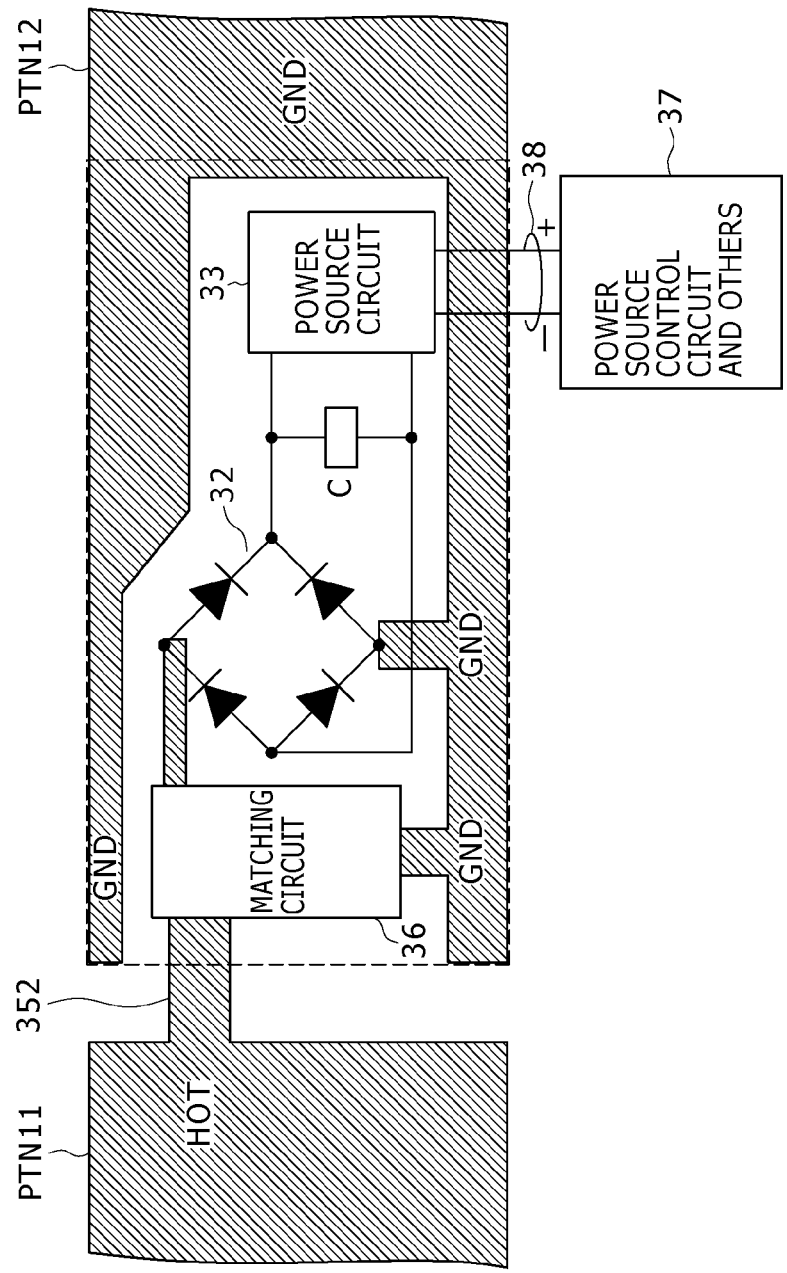
FIG. 18 is a circuit diagram, partly in block, concretely showing the connection relationship between the shield case and the coil of the secondary side circuit portion shown in FIG. 17.

FIG. 18 is a circuit diagram, partly in block, concretely showing the connection relationship between the shield case and the coil of the secondary side circuit portion shown in FIG. 17.

In the cases of FIGS. 17 and 18, a matching circuit 36 is connected between the coil 311 and the rectifying circuit 32.

As described above, in the power receiving apparatus 30 as well, a configuration is adopted in which the power receiving side circuit portion 30 is also integrated with the coil 311.

Since a portable electronic apparatus is supposed in the case of the secondary side apparatus shown here, the power source line or the like is not basically wired to the outside of the secondary side apparatus. Therefore, for example, the influence due to leakage of the high-frequency current to the outside of the secondary side apparatus needs not to be taken into consideration.

One terminal of the matching circuit 32 of the power receiving circuit is connected as a hot terminal 352 to an outer circumference side end portion of the coil pattern PTN11, and a grounding GND terminal thereof is connected to the shield case 351.

A portion at the grounding (GND) potential of the circuit portion 35 is provided in the form of the pattern PTN12 so as to extend to the outside of the shield case 351. Also, the pattern PTN12 is electrically connected to one end side (inner circumference side end portion) of the spiral pattern PTN11 of the coil 311.

A terminal (+) and a terminal (−) of the power source circuit 33 are connected to a main board 37 to which a power source control circuit and the like of a receiving apparatus (power receiving apparatus) 30 are mounted.

As has been described, in the power receiving apparatus 30 as well, the coil 311 and the shield case 351 are connected to each other. Since each of drawing lines 38 from the secondary side circuit portion 35 is different in electric potential from the shield case 351, these drawing lines 38 are insulated from the shield case 351.

As has been described, according to the embodiment, the coils of the power feeding apparatus 20 and the power receiving apparatus 30 are formed so as to be integrated with the circuit portion.

Basically, the portion at the grounding (GND) potential of the circuit portion is electrically connected to the pattern of the coil, and thus the circuit portion functions as one element for determining the inductance value of the coil.

The circuit portion is shielded, and thus the shield structure functions as one element for determining the inductance value of the coil.

The coil is structured so as to resonate with the capacitance at the desired resonant frequency fo, and thus either the circuit portion or the shield structure functions as one element for determining the resonant frequency.

The floating capacitance component of the coil, the capacitance of the capacitor element, or the like is used as the capacitance composing the resonance at this time.

Also, according to the embodiment of the present disclosure, the following effects can be obtained.

In the embodiment, the circuit portion is configured inside the coil shape, the circuit portion has the shield structure composed of the metallic box except for a part thereof composing the interface portion with the outside, and thus the circuit portion is configured as a part of the coil. As a result, when the circuit portion and the coil are disposed adjacent to each other (disposed close to each other), it is possible to prevent the characteristics deterioration due to the floating capacitance, the eddy-current loss and the like from being caused.

In addition, since the circuit portion and the coil can be integrated with each other, it is possible to reduce the entire size.

The present disclosure contains subject matter related to that disclosed in Japanese Priority Patent Application JP 2010-192088 filed in the Japan Patent Office on Aug. 30, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic component, comprising:
a coil; and
a circuit portion that includes a grounding terminal and a hot terminal, wherein both said grounding terminal and said hot terminal are connected to said coil, wherein, said grounding terminal of said circuit portion is directly connected to a first end side of said coil, and said hot terminal of said circuit portion is directly connected to a second end side of said coil, said coil is electrically connected across said circuit portion and said circuit portion is integrated with said coil within said electronic component,
wherein said circuit portion is accommodated in a shield case, and said first end side of said coil is connected to said shield case.

2. The electronic component according to claim 1, wherein a grounding electric potential of said circuit portion is connected to a pattern of said coil, and said circuit portion is configured to function as an element that determines an inductance value of said coil.

3. The electronic component according to claim 1, wherein said circuit portion is shielded with said shield case, and said shield case is configured to function as an element to determine an inductance value of said coil.

4. The electronic component according to claim 1, wherein said coil is provided so as to make resonance at a desired frequency, and at least one of said circuit portion or said shield case is configured to function as an element to determine a resonant frequency.

5. The electronic component according to claim 4, wherein a capacitance that generates said resonance, contains a floating capacitance component of said coil.

6. The electronic component according to claim 1, wherein
said grounding terminal of said circuit portion extends outside said shield case.

7. A power feeding apparatus, comprising:
a power transmitting side coil portion having a coil configured to wirelessly transmit electric power;
a circuit portion having a grounding terminal and a hot terminal, wherein both said grounding terminal and said hot terminal are connected to said coil, said circuit portion including:
a converter configured to convert AC electric power into DC electric power; and
a power transmitting circuit configured to:
receive said DC electric power from said converter, generate a high-frequency electric power, and
transmit said high-frequency electric power to said power transmitting side coil portion,
wherein said grounding terminal of said circuit portion is directly connected to a first end side of said coil, and said hot terminal of said circuit portion is directly connected to a second end side of said coil, said coil is electrically connected across said circuit portion and said circuit portion is integrated with said coil,
wherein said circuit portion is accommodated in a shield case, and said first end side of said coil is connected to said shield case.

8. The power feeding apparatus according to claim 7, wherein a grounding electric potential of said circuit portion is connected to a pattern of said coil, and said circuit portion is configured to function as an element to determine an inductance value of said coil.

9. The power feeding apparatus according to claim 7, wherein said circuit portion is shielded with said shield case, and said shield case is configured to function as an element to determine an inductance value of said coil.

10. The power feeding apparatus according to claim 7, wherein said coil is provided so as to make resonance at a desired frequency, and at least one of said circuit portion or said shield case is configured to function as an element to determine a resonant frequency.

11. The power feeding apparatus according to claim 7, wherein
said converter includes an AC/DC converter configured to convert an AC voltage into a DC voltage, and an insulated DC/DC converter configured to convert said DC voltage obtained from said AC/DC converter into a different DC voltage; and
said circuit portion includes said insulated DC/DC converter and said power transmitting circuit, and said insulated DC/DC converter is connected to said AC/DC converter disposed on a circuit portion side through a power source line.

12. The power feeding apparatus according to claim 7, wherein
said converter includes an AC/DC converter to convert an AC voltage into a DC voltage; and
said circuit portion includes said AC/DC converter and said power transmitting circuit.

13. The power feeding apparatus according to claim 11, wherein said grounding terminal of each of circuit elements included in said circuit portion is connected to said shield case.

14. A power receiving apparatus, comprising:
a power receiving side coil portion having a coil configured to receive wirelessly transmitted electric power;
a rectifier circuit configured to rectify said electric power received by said power receiving side coil portion; and
a power source circuit configured to stabilize said rectified electric power obtained from said rectifier circuit, and supply said stabilized electric power to a load,
wherein, said power receiving apparatus further comprises:
a circuit portion having a grounding terminal and a hot terminal, wherein both said grounding terminal and said hot terminal are connected to said coil, and having at least said rectifier circuit and said power source circuit therein; and
said grounding terminal of said circuit portion is directly connected to a first end side of said coil, and said hot terminal of said circuit portion is directly connected to a second end side of said coil, said coil is electrically connected across said circuit portion and said circuit portion is integrated with said coil,
wherein said circuit portion is accommodated in a shield case, and said first end side of said coil is connected to said shield case.

15. The power receiving apparatus according to claim 14, wherein a grounding electric potential of said circuit portion is connected to a pattern of said coil, and said circuit portion is configured to function as an element to determine an inductance value of said coil.

16. The power receiving apparatus according to claim 14, wherein said circuit portion is shielded with said shield case, and said shield case is configured to function as an element to determine an inductance value of said coil.

17. The power receiving apparatus according to claim 14, wherein said coil is provided so as to make resonance at a desired frequency, and at least one of said circuit portion or said shield case is configured to function as an element to determine a resonant frequency.

18. The power receiving apparatus according to claim 14, wherein said grounding terminal of each of circuit elements included in said circuit portion except for said power source circuit is connected to said shield case.

19. A wireless power feeding system, comprising:
a power feeding apparatus configured to transmit electric power via a magnetic field sympathetic relationship; and a power receiving apparatus configured to receive electric power transmitted from said power feeding apparatus, wherein said power feeding apparatus includes:
- a power transmitting side coil portion having a coil configured to wirelessly transmit electric power,
- a converter configured to convert AC electric power into DC electric power, and
- a power transmitting circuit configured to receive DC electric power from said converter, generate a high-frequency electric power, and transmit said high-frequency electric power to said power transmitting side coil portion, said power receiving apparatus includes:
- a power receiving side coil portion having a coil configured to receive wirelessly transmitted electric power,
- a rectifier circuit configured to rectify electric power received by said power receiving side coil portion, and
- a power source circuit configured to stabilize said electric power obtained from said rectifier circuit, and supply said stabilized electric power to a load, and at least one of said power feeding apparatus and said power receiving apparatus includes a circuit portion having a grounding terminal and a hot terminal, said grounding terminal is directly connected to a first end side of said coil, and said hot terminal is directly connected to a second end side of said coil, said coil is electrically connected across said circuit portion and said circuit portion is integrated with said coil, wherein said circuit portion is accommodated in a shield case, and said first end side of said coil is connected to said shield case.

20. The wireless power feeding system according to claim 19, wherein said circuit portion of said power feeding apparatus is connected to said power transmitting side coil portion, and includes said power transmitting circuit and at least a part of said converter; and said circuit portion of said power receiving apparatus is connected to said power receiving side coil portion, and includes at least said rectifier circuit and said power source circuit.

* * * * *